United States Patent
Riedel et al.

(10) Patent No.: US 9,533,764 B2
(45) Date of Patent: Jan. 3, 2017

(54) SEAT DEVICE FOR AN AIRCRAFT OR SPACECRAFT

(71) Applicant: AIRBUS OPERATIONS GMBH, Hamburg (DE)

(72) Inventors: Christian Riedel, Bliedersdorf (DE); Stefan Mahn, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/220,927

(22) Filed: Mar. 20, 2014

(65) Prior Publication Data

US 2014/0265481 A1 Sep. 18, 2014

Related U.S. Application Data

(63) Continuation of application No. PCT/EP2012/068978, filed on Sep. 26, 2012.
(Continued)

(30) Foreign Application Priority Data

Sep. 30, 2011 (DE) ........................ 10 2011 083 811

(51) Int. Cl.
| | | |
|---|---|---|
| *A47C 7/62* | (2006.01) | |
| *A47C 31/00* | (2006.01) | |
| *B64D 11/06* | (2006.01) | |
| *B60R 11/02* | (2006.01) | |
| *B60R 16/03* | (2006.01) | |

(Continued)

(52) U.S. Cl.
CPC ........... *B64D 11/06* (2013.01); *B60R 11/0217* (2013.01); *B64D 11/064* (2014.12); *B64D 11/0624* (2014.12); *B60R 16/03* (2013.01); *B64D 2211/00* (2013.01); *F21K 9/30* (2013.01); *F21S 9/032* (2013.01); *H01Q 1/12* (2013.01); *Y02B 10/20* (2013.01)

(58) Field of Classification Search
CPC ............. B60R 16/03; F21K 9/30; F21S 9/032; H01Q 1/12; Y02B 10/20; B64D 11/0624
USPC 297/217.1, 217.2, 217.3; 136/291; 180/65.1
See application file for complete search history.

(56) References Cited

U.S. PATENT DOCUMENTS

| | | | | |
|---|---|---|---|---|
| 4,933,618 A | * | 6/1990 | Ortlieb | ..................... A47C 1/14 |
| | | | | 297/217.3 |
| 5,329,716 A | * | 7/1994 | Fite | ................................ 40/575 |

(Continued)

FOREIGN PATENT DOCUMENTS

| | | |
|---|---|---|
| CN | 1688231 A | 10/2005 |
| CN | 101808898 A | 8/2010 |

(Continued)

OTHER PUBLICATIONS

German Office Action for Appl. Serial No. 10 2011/083,811.2 dated Aug. 14, 2012.
(Continued)

*Primary Examiner* — Chi Q Nguyen
(74) *Attorney, Agent, or Firm* — Jenkins, Wilson, Taylor & Hunt, P.A.

(57) ABSTRACT

The present disclosure pertains to a seat device for an aircraft or spacecraft with at least one photoelectric device, which is designed to provide electrical energy such that this energy can be used to charge or supply an electrical device, and/or amplify audio signals, and/or transmit data.

12 Claims, 2 Drawing Sheets

Related U.S. Application Data

(60) Provisional application No. 61/541,506, filed on Sep. 30, 2011.

(51) Int. Cl.
*F21K 99/00* (2016.01)
*H01Q 1/12* (2006.01)
*F21S 9/03* (2006.01)

(56) References Cited

U.S. PATENT DOCUMENTS

| | | | |
|---|---|---|---|
| 5,975,630 A * | 11/1999 | Schreiber | 297/217.3 |
| 6,749,257 B2 * | 6/2004 | Muller | 297/217.3 |
| 8,002,349 B1 * | 8/2011 | Pizzuto | 297/217.3 |
| 8,016,351 B2 * | 9/2011 | Cassaday | 297/217.1 |
| 8,321,611 B2 | 11/2012 | Francois et al. | |
| 8,388,056 B2 * | 3/2013 | Smith et al. | 297/180.12 |
| 8,646,837 B2 * | 2/2014 | Bovelli et al. | 297/217.3 |
| 8,789,884 B1 * | 7/2014 | Edelman et al. | 297/188.13 |
| 8,926,008 B1 * | 1/2015 | Al-Hasan | 297/17 |
| 2005/0142635 A1 * | 6/2005 | Tsuchiya et al. | 435/69.1 |
| 2010/0078978 A1 * | 4/2010 | Owens | 297/250.1 |
| 2011/0193372 A1 * | 8/2011 | Pizzuto | 297/16.1 |
| 2012/0305414 A1 * | 12/2012 | Magnus | 206/216 |
| 2014/0097652 A1 * | 4/2014 | Minkoff et al. | 297/180.14 |
| 2014/0368003 A1 * | 12/2014 | Squires et al. | 297/16.2 |

FOREIGN PATENT DOCUMENTS

| | | |
|---|---|---|
| DE | 10063406 A1 | 5/2002 |
| DE | 2005/038972 B3 | 8/2006 |
| DE | 2007/055088 A1 | 5/2009 |
| FR | 2810931 | 1/2002 |
| JP | H0 9170210 A | 6/1997 |
| WO | WO 2009/144687 A2 | 1/2002 |
| WO | WO 2009/062974 A1 | 5/2009 |
| WO | WO 2013/045501 A1 | 4/2013 |

OTHER PUBLICATIONS

Chinese Office Action for Application No. 201280047227.0 dated Feb. 3, 2015.

Chinese Office Action for Application No. 201280047227.0 dated Sep. 16, 2015.

* cited by examiner

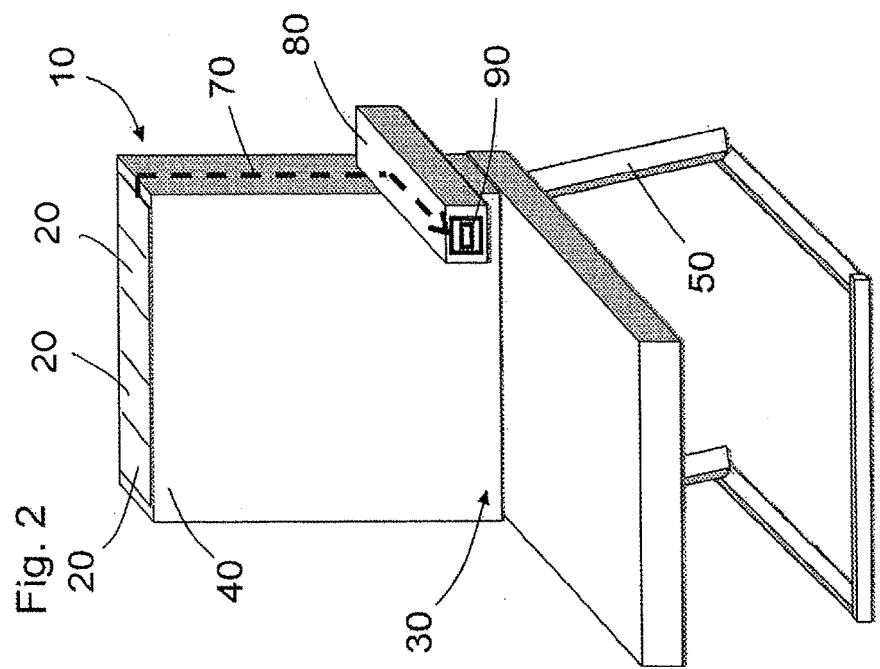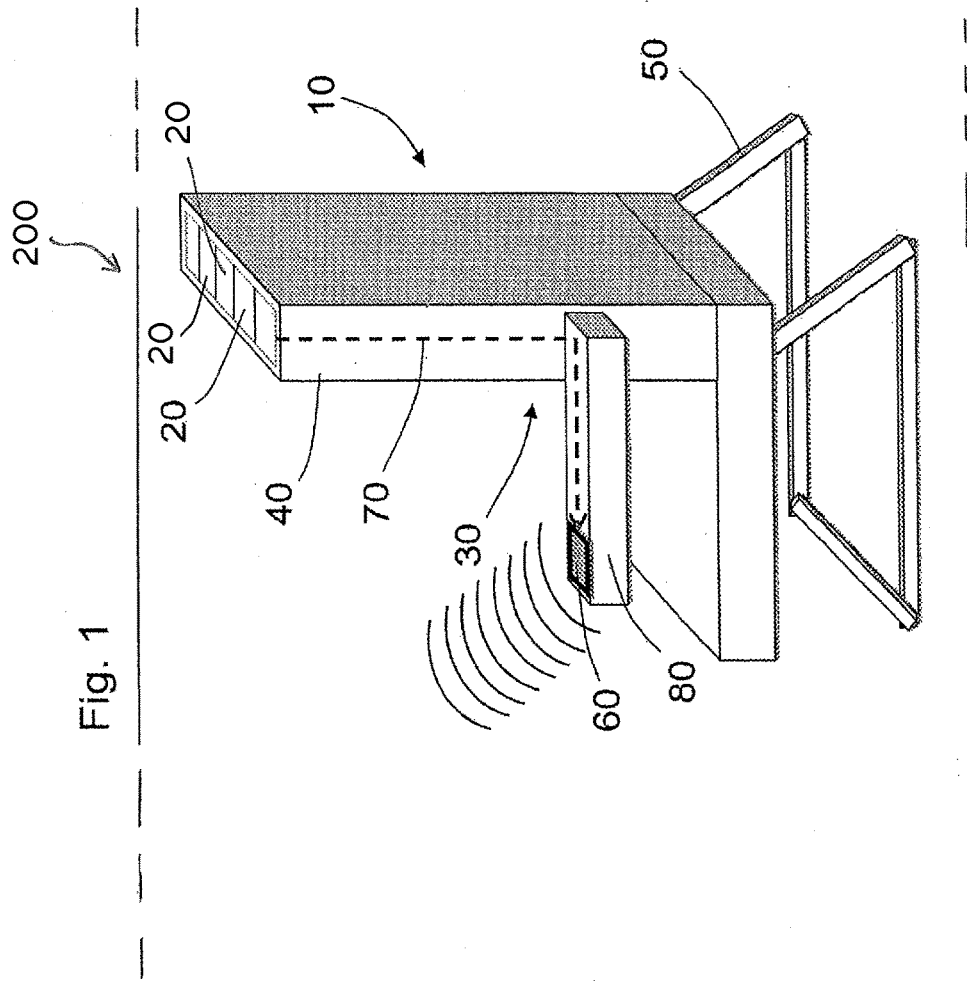

SEAT DEVICE FOR AN AIRCRAFT OR SPACECRAFT

CROSS-REFERENCES TO RELATED APPLICATIONS

This application is a continuation of and claims priority to PCT/EP2012/068978, filed Sep. 26, 2012, which claims the benefit of and priority to U.S. Provisional Application 61/541,506, filed Sep. 30, 2011 and German Patent Application 10 2011 083 811.2, filed Sep. 30, 2011, the entire disclosures of which are incorporated by reference herein.

TECHNICAL FIELD

The present invention relates to a seat device for an aircraft or spacecraft.

Although it may be used on any seat devices in an aircraft or spacecraft, the present invention and the underlying problems are explained in detail with respect to an aircraft.

BACKGROUND

A power supply is required nowadays for many functions in the passenger seat. Thus seats often include a so-called passenger control unit (PCU) which usually includes an amplifier for headphones and control buttons for the in-flight entertainment system (IFE). It is also becoming increasingly necessary to be able to charge electronic devices provided by the passengers (so-called passenger electronic devices (PED)) via a standardised interface during the flight.

A power supply is also provided for laptops and in the IFE displays fitted in the seat backs for long-distance flights. However, such applications have relatively high power requirements, with the result that this power supply must be provided via the on-board power supply network.

According to DE 10 2007 055 088 A1, an aircraft seat is known from the prior art which comprises a monitoring device which monitors status values for the seat, such as whether or not a person is present on the seat, the position of the armrest, the position of a folding table on the backrest, etc. An individual sensor module is provided for this purpose which comprises its own power supply element. However, this is not accessible for the purpose of performing the above-mentioned functions.

SUMMARY

One idea of the present disclosure is therefore to create a seat device for an aircraft or spacecraft which makes it possible to provide a simple power supply for the above-mentioned applications with low power consumption.

Accordingly, a seat device is provided with a photoelectric device which offers at least one option to charge or supply an electrical device (with electricity), and/or amplify audio signals, and/or transmit data.

One idea underlying the present invention is that the power generated by the photoelectric device is used for at least one of the functions of charging or supplying an electrical device with electricity, and/or amplifying audio signals, and/or transmitting data, the power being generated directly at the seat.

One benefit of the present invention is that the incident light from the cabin illumination system, reading lights and any sunlight which might be present at certain times can be used to generate the power produced by the photoelectric device, thus dispensing with the wiring to supply the passengers' own electronic devices and/or the PCU from the on-board network of the aircraft. The seat power supply is thus completely independent from the on-board network.

In addition, the present invention advantageously permits a flexible and reasonably-priced power supply system with independent seats which do not require any wires or components to connect them to the on-board network. Such seats can therefore be moved and rearranged inside the aircraft cabin at will, without the need for new wiring when installing the seat.

The power generated in the photoelectric device is preferably supplied to the PED with the aid of a standardised interface for charging, e.g. a USB interface. In this case the seat device comprises the standardised interface in the region of its surface, especially in the region of an armrest or seat component.

Power generated in the photoelectric device can also be used to amplify audio signals, possibly by continuing to use the amplifier used previously. The amplifier may also perform the function of transmitting audio signals, for example wirelessly, in the inner part of the aircraft cabin. The power generated by the photoelectric device can preferably also be used to supply a control panel to control playback of audio signals.

The power generated by the photoelectric device can also be used to supply an electrical device, especially the PCU. The power generated by the photoelectric device can also be used to transmit data. Thus, the power generated by the photoelectric device can preferably also be used to control cabin functions, especially to transmit control signals, such as, for example, the so-called pax call (cabin crew call function), to the cabin management system.

Advantageous embodiments and improvements of the invention are described in the sub-claims.

In accordance with a further embodiment, the photoelectric device is designed as a solar cell. This makes it possible to use reasonably-priced components to generate power, with a configuration selected according to the proposed scope of the above-mentioned functions to be performed.

In accordance with a further embodiment, the photoelectric device is arranged in the uppermost region of the seat device. Thus, the photoelectric device may be arranged in the region of the headrest of the seat device in particular, such that the light emitted by the cabin illumination system and/or a reading light can be used to the optimum extent by the photoelectric device to supply power, as shade cast by the passenger or an object is minimal in this region. In addition, positioning the photoelectric device in the uppermost region of the seat device offers the advantage that this can easily be retrofitted in this position.

In accordance with a further embodiment, the photoelectric device is arranged on a cover which can be connected to the seat device. In this case the above-mentioned functionality to perform charging and/or amplify audio signals is also achieved by the photoelectric device. This advantageously permits the photoelectric device or a component supplied with power by this device to be replaced quickly in the event of damage so that it can be replaced by the on-board crew during the flight. In addition, using a cover comprising the photoelectric device means that it is simple to retrofit existing seat devices in an aircraft.

In accordance with a further embodiment, the seat device also comprises a rest portion, the photoelectric device being arranged in the region of the rest portion. The rest portion is preferably formed by an upper region of the rest portion of the seat device. In order to enlarge the area available for the power supply, the photoelectric device may also be arranged in the upper region of the rest portion, the power supply for components connected electrically to the photoelectric device (e.g. the PED) being reliably guaranteed.

In accordance with a further embodiment, the photoelectric device is arranged on a side region of the seat device and inclined towards the seat region of the seat device. In order to enlarge the area available for the power supply, the photoelectric device may also be arranged on the side region of the seat device. In this case the design of the photoelectric device arranged in the side region of the seat device may follow the design of the seat device in this region.

In accordance with a further embodiment, the photoelectric device comprises lenses to focus and amplify the incident light. In this case the lenses are preferably arranged in the region of the outer surface of the photoelectric device. In addition, the material properties of the lenses are preferably selected such that absorption of the wavelength of the incident light which causes energy to be generated in the photoelectric device during operation is minimised. As a result the wavelength available for energy generation in the photoelectric device is converted to electrical energy in the best possible manner.

In accordance with a further embodiment, a large number of photoelectric devices are provided, these being located adjacent to each other. In particular, the usually elliptical region of the headrest of a seat device in an aircraft may be provided with a large number of photoelectric devices which each follow the design of the headrest in its tangential direction over a predefined width. As large as possible a surface area of the seat device can be provided with photoelectric devices by means of this configuration, thus increasing the amount of energy which can be generated.

In addition, the disclosure pertains to a seat module with at least one seat device for an aircraft or spacecraft according to the present invention.

In addition, the disclosure pertains to a cover for an aircraft or spacecraft with at least one photoelectric device, which is designed to provide electrical energy such that this energy can be used to charge or supply an electrical device, and/or amplify audio signals, and/or transmit data.

In addition, the disclosure pertains an aircraft or spacecraft with a seat module according to the present invention.

BRIEF DESCRIPTION OF THE DRAWINGS

The invention is explained below in greater detail with the aid of embodiments and with reference to the attached figures in the drawing.

The figures are as follows:

FIG. 1 shows a schematic side view of a seat device according to one embodiment of the invention;

FIG. 2 shows a schematic perspective view of a seat device according to a further embodiment of the invention.

In the figures, like reference numerals refer to like components or components with like function, unless otherwise specified.

DETAILED DESCRIPTION

Figure 3:
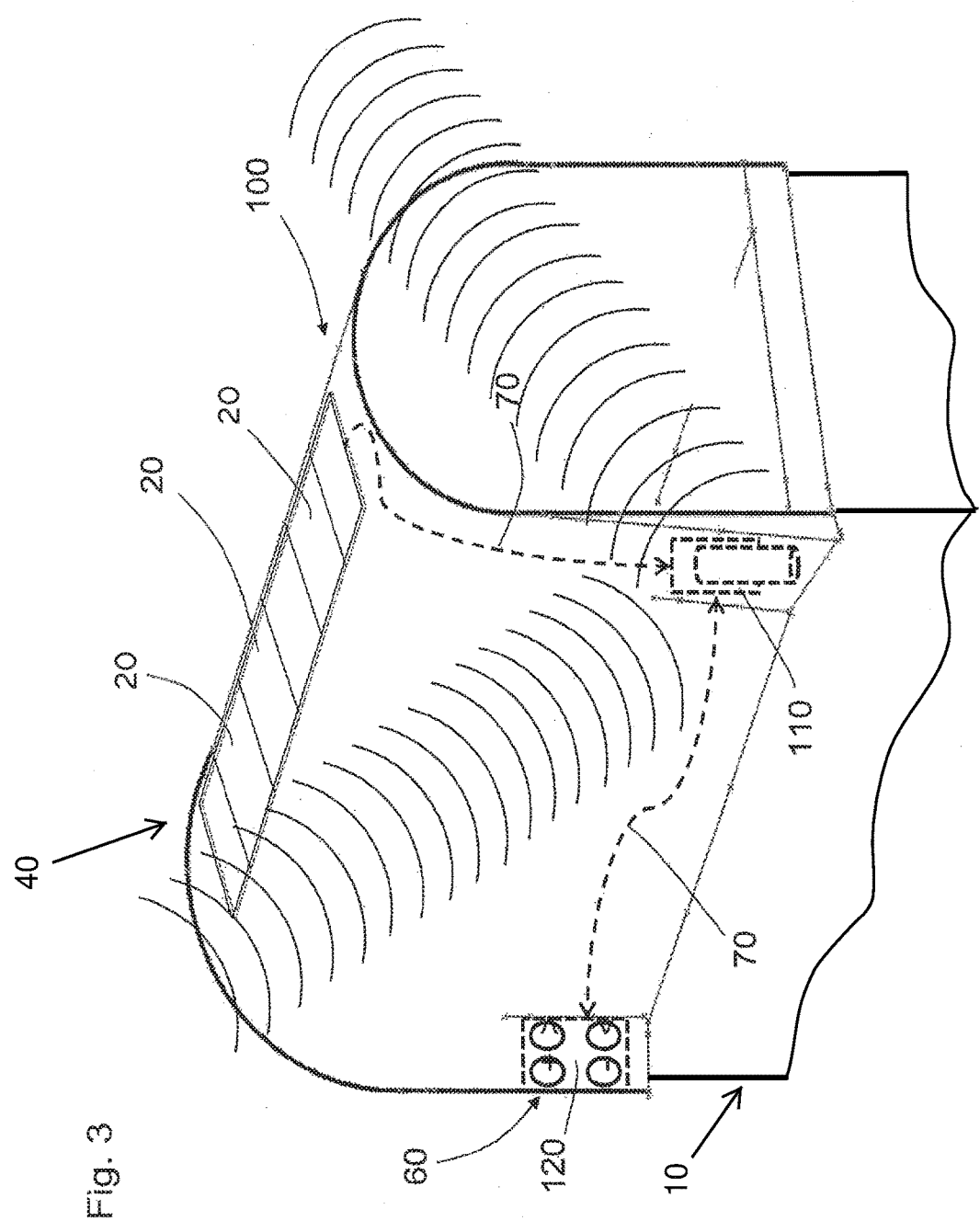
FIG. 3 shows a schematic perspective view of a cover according to the invention to be connected to a seat device.

FIG. 1 shows a schematic view from the side of a seat device 10 according to the invention, which comprises a seat region 30 and a region of a headrest 40, which is formed at an upper end of the seat device 10. The seat device 10 comprises a seat frame 50 in the region of its underside, this seat frame being used to connect the seat to an aircraft or spacecraft 200.

The seat device 10 comprises an armrest 80 in the region of a transverse end of the seat region 30, this armrest comprising a passenger control unit (PCU) 60 on its surface in the region of its free longitudinal end. The PCU 60 may for example comprise an amplifier for headphones (not illustrated) and a control panel with control buttons (not illustrated) for an in-flight entertainment system.

The PCU 60 is supplied with electrical energy which is generated by a solar cell by means of a power cable 70. In this case the photoelectric device is formed by the solar cell. The solar cell may extend substantially along the transverse direction of the seat device 10 and is arranged at the upper end of the headrest 40.

The present seat device 10 advantageously enables the PCU 60 to be supplied with energy independently of the on-board network of the aircraft 200, so that the present seat device 10 does not need to be connected to this network, as would otherwise be the case.

The PCU 60 may also comprise a transmitter (not illustrated) and a receiver (not illustrated). These are used to transmit the control commands received from the PCU 60, preferably wirelessly, to an associated receiver (not illustrated), e.g. the IFE system, and for wireless reception of audio signals.

FIG. 2 shows a schematic perspective view of a seat device according to a second embodiment of the invention. This embodiment of the seat device 10 according to the invention is substantially identical to the seat device in FIG. 1 with the result that only differences are explained below.

The seat device 10 no longer contains a PCU in the region of the armrest 80, but instead comprises an interface for the power supply 90 for an electrical device (not illustrated) in the region of the free longitudinal end of the armrest 80, this interface being supplied with electrical energy by means of a power cable 70 from the solar cell. The interface for the power supply 90 extends substantially along the thickness direction of the armrest 80. The interface for the power supply 90 is in particular a USB interface which makes it possible to transmit electrical energy. The electrical device may be a so-called passenger electronic device (PED), e.g. an MP3 player or a smartphone, which only requires minimal power consumption for charging purposes. The proposed seat device 10 thus makes it possible to provide an independent power supply for an electrical device with low energy consumption, with the result that it is no longer necessary for this electrical energy to be supplied by the on-board network of the aircraft 200.

FIG. 3 shows a schematic perspective view of a cover 100 according to the invention. The cover 100 is connected to a headrest 40 on a seat device 10. The cover 100 is in this case formed from a material which does not have any inherent rigidity, with the result that the cover 100 is preferably connected to a portion of the seat device by placing over this portion, the cover 100 then substantially assuming the form of the connection region with the seat device.

One or more photoelectric device 20 is arranged in the region of the upper end of the cover 100, this device preferably taking the form of a solar cell. For example, a plurality of photoelectric devices 20 are arranged in the region of the upper end of the cover 100 as illustrated in FIGS. 1-3. The solar cell extends in particular in the longitudinal direction of the cover 100.

The cover 100 also comprises an amplifier 110 in a region of the longitudinal end thereof, this amplifier being supplied via a power cable 70 with electrical energy which is generated by the solar cell and supplied to the amplifier 110. The amplifier 110 comprises a mechanical interface for connection to headphones (not illustrated) such that a passenger can hear the audio signal amplified by the amplifier 110. In addition, the amplifier 110 may comprise a transmitter/receiver (not illustrated) which is designed to send control signals to the IFE system or the cabin management system and to receive input signals from the audio channel of the IFE system wirelessly, these signals being passed in turn to the amplifier 110, so that it is advantageously no longer necessary to have a wired connection from the IFE system to the amplifier 110.

The cover 100 also comprises a passenger control unit (PCU) 60 with a control panel 120 in a region of its longitudinal end opposite the amplifier 110 on the same side, this control panel being supplied with electrical energy which is generated by the solar cell. The PCU 60 is designed to provide control commands for operation of the amplifier 110, so that in particular the volume of the audio signal amplified by the amplifier 110 can be adjusted by the passenger on the control panel 120 of the PCU 60.

The present cover 100 advantageously permits a wireless solution for audio playback within an IFE system (not illustrated) due to the PCU 60 being provided with a transmitter connected to the amplifier 110 described above, in which wires are not required to transmit the audio signal to the passenger, nor to supply electrical power to the PCU 60 which is otherwise usually located in the seat. In addition, when using the present cover 100, it is advantageously no longer necessary to modify the seat, with the result that the cover 100 can easily be retrofitted to existing seats or seat modules for aircraft 200.

Although the present invention has been described here by means of preferred embodiments, it is not limited to these embodiments, but rather may be modified in multiple ways.

For example, the solar cell may comprise a large number of lenses on its surface with material properties which are selected such that absorption of the wavelength of the incident light which causes energy to be generated in the photoelectric device during operation is minimised.

What is claimed is:

1. A seat device for an aircraft or spacecraft comprising at least one photoelectric device which is designed to provide electrical energy for charging or supplying an electrical device, and at least one of amplifying audio signals and transmitting data, wherein the photoelectric device is arranged on a removable cover and the removable cover is connected to the seat device.

2. The seat device according to claim 1, wherein the photoelectric device is designed as a solar cell.

3. The seat device according to claim 1, wherein the photoelectric device is arranged in an uppermost region of the seat device.

4. The seat device according to claim 1, wherein the seat device comprises a rest portion, the photoelectric device being arranged in a region of the rest portion.

5. The seat device according to claim 1, wherein the photoelectric device is arranged on a side region of the seat device and is inclined towards a seat region of the seat device.

6. The seat device according to claim 1, wherein the photoelectric device comprises lenses for focusing and amplifying an incident light.

7. The seat device according to claim 1, wherein a plurality of photoelectric devices are provided which are arranged adjacent to each other.

8. A seat module comprising at least one seat device for an aircraft or spacecraft according to claim 1.

9. An aircraft or spacecraft comprising at least one seat module according to claim 8.

10. The seat device according to claim 1, wherein the seat device comprises a seat region and a region of a headrest, which is formed at an upper end of the seat device, wherein the removable cover is placed over the headrest of the seat device, and wherein the photoelectric device is arranged in the region of the upper end of the removable cover and the photoelectric device extends in a longitudinal direction of the removable cover.

11. The seat device according to claim 10, wherein the removable cover fits to a form of the headrest.

12. A removable cover for an aircraft or spacecraft comprising at least one photoelectric device which is designed to provide electrical energy for charging or supplying an electrical device, and at least one of amplifying audio signals and transmitting data, wherein the photoelectric device is arranged on the removable cover and is connected to a seat device of the aircraft or spacecraft.

\* \* \* \* \*